US008231059B2

(12) United States Patent
Sakama

(10) Patent No.: US 8,231,059 B2
(45) Date of Patent: Jul. 31, 2012

(54) RADIO FREQUENCY IC TAG

(75) Inventor: Isao Sakama, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 378 days.

(21) Appl. No.: 12/575,932

(22) Filed: Oct. 8, 2009

(65) Prior Publication Data

US 2010/0090015 A1 Apr. 15, 2010

(30) Foreign Application Priority Data

Oct. 9, 2008 (JP) ................................ 2008-262352

(51) Int. Cl.
*G06K 19/06* (2006.01)
*G08B 13/14* (2006.01)
*H01Q 1/38* (2006.01)
*H01Q 9/04* (2006.01)
*H01Q 5/00* (2006.01)

(52) U.S. Cl. ............... 235/492; 340/572.7; 343/700 MS

(58) Field of Classification Search .................. 235/492; 340/572.1, 572.7, 572.8; 343/700 MS, 860, 343/795, 873
See application file for complete search history.

(56) References Cited

U.S. PATENT DOCUMENTS 6,919,857 B2 * 7/2005 Shamblin et al. ............ 343/795
7,145,510 B2 * 12/2006 Liu et al. ................ 343/700 MS
7,365,686 B2 * 4/2008 Sakama et al. ......... 343/700 MS
7,859,414 B2 * 12/2010 Kai et al. .................. 340/572.7
2005/0078037 A1 * 4/2005 Leclerc et al. ................ 343/702
2005/0134460 A1 * 6/2005 Usami ........................ 340/572.7
2006/0244605 A1 11/2006 Sakama et al.
2011/0017832 A1 * 1/2011 Ritamaki et al. .............. 235/492

FOREIGN PATENT DOCUMENTS

EP 1 538 560 B1 1/2007
EP 1 921 571 A2 5/2008
JP 2002-135029 5/2002

OTHER PUBLICATIONS

Extended European Search Report Communication issued Jan. 4, 2010 in Application No. 09252379.4-2220 (6 pages).

* cited by examiner

*Primary Examiner* — Michael G Lee
*Assistant Examiner* — Suezu Ellis
(74) *Attorney, Agent, or Firm* — Foley & Lardner LLP

(57) ABSTRACT

A micro-strip antenna includes two conductors. One of the conductors is a radiation electrode including a first radiation electrode including an IC chip and a slit and a U-shaped second radiation electrode. The antenna further includes an opening and a cutout formed by the first and second radiation electrodes and a radiation electrode.

8 Claims, 12 Drawing Sheets

RADIO FREQUENCY IC TAG

INCORPORATION BY REFERENCE

The present application claims priority from Japanese application JP 2008-262352 filed on Oct. 9, 2008, the content of which is hereby incorporated by reference into this application.

BACKGROUND OF THE INVENTION

The present invention relates to a technique for use with a radio frequency IC tag, and in particular, to a technique of matching impedance for a micro-strip antenna to be mounted on a radio frequency IC tag.

A radio frequency IC tag is capable of communicating information by radio, for example, transmitting therefrom information such as an IDentification (ID) number stored in the IC tag. Hence, a reader/writer device which communicates with the radio frequency IC tag can conduct a contactless operation to read the information recorded in the IC tag without making contact with the IC tag. Thanks to the radio communication, the information recorded in the IC tag can be read therefrom even if the IC tag is placed in a bag or a box. Therefore, the radio frequency IC tag is broadly used for production management and distribution management of articles.

The radio frequency IC tag includes an IC chip having recorded information and an antenna to communicate by radio the information recorded in the IC chip. Various types of antennas are available for the IC tag. A representative example is a dipole antenna in which the terminals of the IC chip are respectively connected to peripheral ends of two metallic plates. Due to the simple structure and the low unit price, the dipole antenna is suitably employed when it is attached onto a large number of articles. However, when the article onto which the radio frequency IC tag is attached is made of a metallic material or a material containing moisture, e.g., a meat, a living body, or a vegetable, the communicable distance of the IC tag rapidly drops and the communication is disabled depending on cases. However, as commonly known, a micro-strip antenna is capable of securing a stable communicable distance even if the radio frequency IC tag is attached onto the articles described above.

In general, the micro-strip antenna includes a radiation electrode, a ground conductor, and a dielectric interpolated between two conductors, i.e., the electrode and the conductor. The antenna is powered by connecting the radiation electrode to the ground conductor. When the micro-strip antenna is employed in a radio frequency IC tag, both terminals of the IC chip mounted in the IC tag are connected to the power feed points of the antenna.

However, in the micro-strip antenna, the conductors are connected through the dielectric by use of the IC chip terminals. When the antenna is pressed by external force and is deformed, the distance between the associated components of the antenna changes and hence the connection is disturbed.

Description will now be given of impedance matching between the IC chip and the antenna.

Impedance of the IC chip includes a resistance component and a reactance component. This is also the case with impedance of the antenna. For example, if the reactance of the IC chip is the capacitance component and the reactance component of the antenna is the inductance component, influences from the respective components can be mutually cancelled out. Hence, a current obtained by the antenna is efficiently fed to the IC chip in operation. However, if the IC chip is connected to the antenna with discrepancy between the capacitance component and the reactance component, namely, with impedance mismatching, it is not possible to efficiently feed the current from the antenna to the IC chip. This leads to reduction in the communicable distance of the radio frequency IC tag. The known techniques to establish impedance matching in this situation include the technique to change the power feed position of the antenna, the technique to connect a coil and a capacitor to the antenna, and the technique to provide structure called "slit" in the power feed section (JP-A-2002-135029).

SUMMARY OF THE INVENTION

As above, the micro-strip antenna is advantageously immune against influence from the material of the object or article onto which the IC tag is attached. Also, by installing the IC chip in the radiation electrode, it is possible to strengthen the IC chip against external force.

However, the slit disposed for impedance matching provides only a narrow range of the impedance matching (JP-A-2002-135029). For large impedance difference between the IC chip and the antenna, the slit is not sufficient to establish impedance matching depending on cases. In a situation in which the radio frequency IC tag is limited in size, if the antenna size is less than the frequency for the operation, namely, the antenna tuning frequency, the capacitance component of the IC chip cannot be cancelled out. This results in impedance mismatching between the antenna and the IC chip. For the impedance matching, it is necessary to modify the contour of the antenna.

If the thickness of the dielectric changes in the micro-strip antenna, the impedance at the power feed point of the radiation electrode changes. That is, each time the thickness of the IC tag changes, it is required to adjust the impedance matching between the IC chip and the radiation electrode.

In this regard, if the method of matching impedance by use of a coil is employed, the overall size of the IC tag inevitably becomes greater. Accordingly, this method is not suitable to downsize the IC tag.

It is therefore an object of the present invention, which has been devised in consideration of the problems above, to provide a small-sized micro-strip antenna for use with a radio frequency IC tag wherein impedance matching is possible between the micro-strip antenna and an IC chip without changing the contour of the antenna.

According to the present invention, the micro-strip antenna includes two conductors, i.e., first and second conductors. The first conductor is a radiation electrode which includes a first radiation electrode including an IC chip and a slit and a U-shaped second radiation electrode. The antenna further includes an opening and a cutout formed by the first and second radiation electrodes.

According to the present invention, the impedance matching is possible for the micro-strip antenna at a desired frequency by use of the opening formed by the radiation electrodes, without changing the antenna size of the micro-strip antenna.

Other objects, features and advantages of the invention will become apparent from the following description of the embodiments of the invention taken in conjunction with the accompanying drawings.

DESCRIPTION OF THE EMBODIMENTS

Outline of Embodiments

Figure 1:
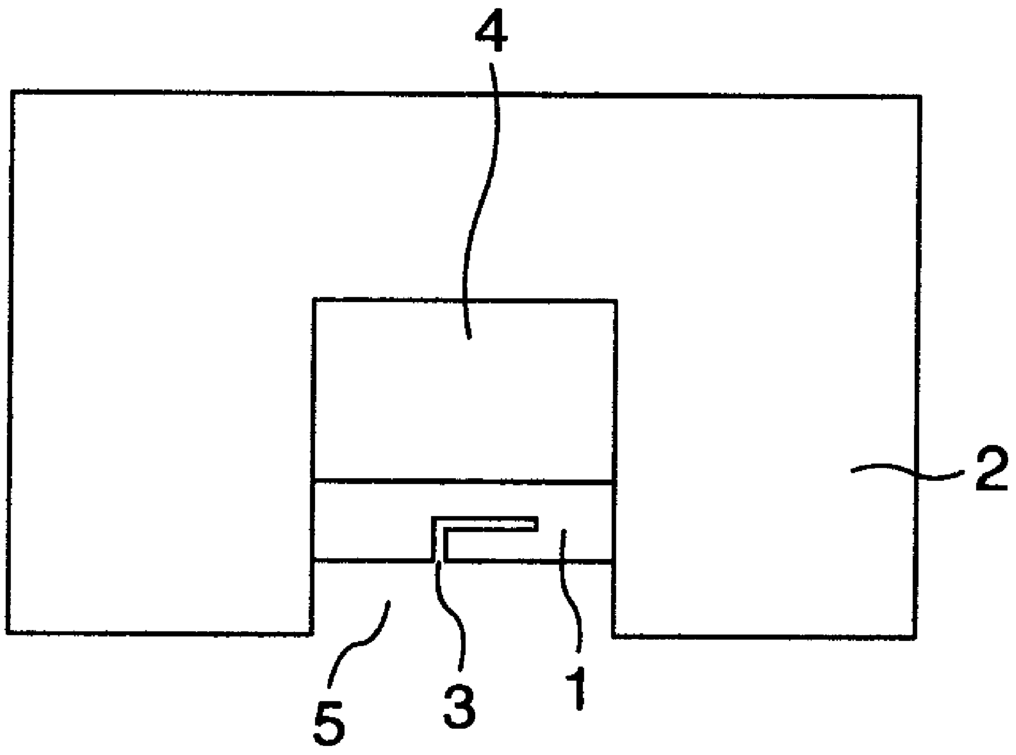
FIG. 1 is a schematic diagram showing a configuration of a radiation electrode according to the present invention.

Referring now to the drawings, description will be given of embodiments suitable for a radio frequency IC tag according to the present invention.

In the description of the embodiments, a return loss is employed as an index to indicate a state of impedance matching. The return loss is represented as a ratio between power incident to the power feed point of an antenna and power reflected from the power feed point. If the incident power is totally reflected, the return loss is zero decibel (0 dB). If the incident power is not reflected at all, the return loss is $-\infty$ dB.

Figure 10:
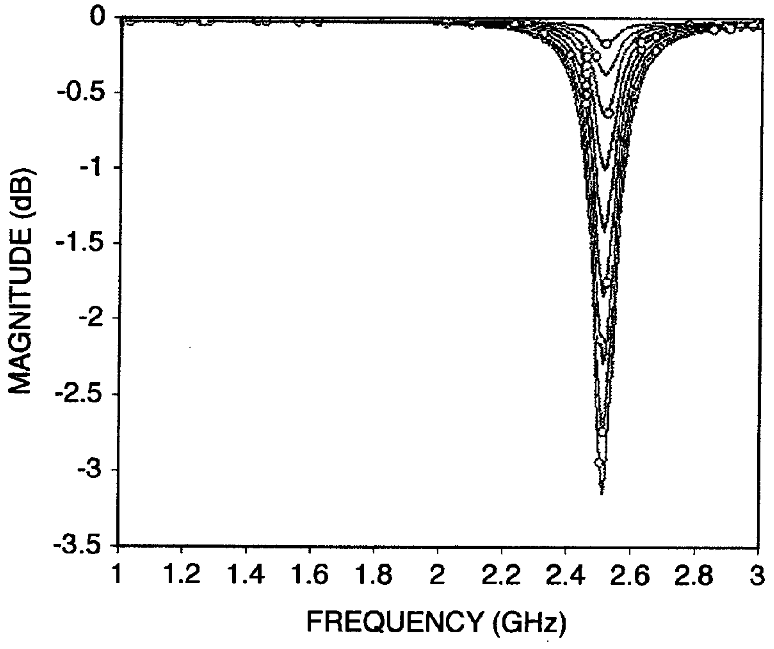
FIG. 10 is a graph showing a return loss characteristic of a conventional micro-strip antenna.

A general micro-strip antenna includes a radiation electrode to emit a radio wave, a dielectric, and a ground conductor. This antenna is called a patch antenna. In the antenna, the resonance frequency is determined by the size of the radiation electrode. In operation to establish impedance matching of the patch antenna, the center of the radiation electrode is connected to the ground conductor and then the distance from the center position to the power feed position is changed. FIG. 10 shows a return loss characteristic of a patch antenna when the power feed position is moved in a simulation. In the graph of FIG. 10, the ordinate represents the return loss and the abscissa represents the frequency. According to the graph, even if the distance from the center position to the power feed position is changed, the resonance frequency of the antenna little varies and only the return loss is changed. Hence, it is confirmed that the impedance of the antenna is changed by moving the power feed point. As above, a correlation exists between the resonance frequency and the radiation electrode size. Therefore, if a general micro-strip antenna is employed as an antenna of the radio frequency IC tag, it is not possible to freely change the size of the radiation electrode.

Figure 11:
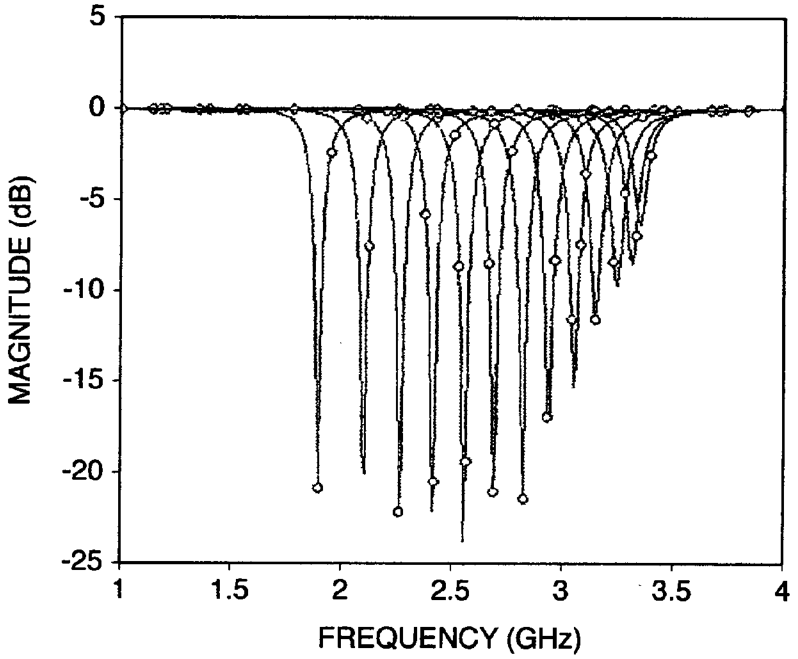
FIG. 11 is a graph showing a return loss characteristic of the micro-strip antenna in the first embodiment.

FIG. 11 shows a return loss characteristic of the micro-strip antenna when the opening size of the second impedance matching section, namely, the value of L3 is changed in ten steps in the embodiments, which will be described below. The graph of FIG. 11 shows ten frequencies associated with the minimum points of the return loss. That is, by changing the size of the opening formed by the first and second radiation electrodes, the resonance frequency of the antenna can be changed. Hence, the reactance component at the power feed point can be appropriately controlled by changing the opening size. This resultantly implies that the object of the present invention is achieved. That is, the impedance matching is possible in a wide range without changing the external dimensions of the antenna.

As above, each embodiment, which will be described below, leads to an advantage wherein without changing the size of the micro-strip antenna, the reactance component can be largely changed according to the size of the opening formed by the first and second radiation electrodes. Hence, the range of impedance matching at the power feed point of the antenna is expanded to thereby facilitate impedance matching between the radiation electrode and the IC chip.

First Embodiment

FIG. 1 shows a radiation electrode section of the first embodiment. A first radiation electrode 1 includes an L-shaped slit 3 which serves as a first impedance matching section and which is formed as a notch extending from one side of an antenna. A rectangular opening 4 formed by a U-shaped second radiation electrode 2 and the first radiation electrode 1 serves as a second impedance matching section. A cutout 5 formed by the first and second radiation electrodes 1 and 2 serves as a third impedance matching section. In the configuration, an IC chip 6 is mounted over the first impedance matching section 3.

The contour of the opening 4 formed by the first and second radiation electrodes is not limited to a rectangle. Even if the contour of the opening 4 is, for example, a circle, the opening 4 similarly serves as the impedance matching section.

Figure 2A:
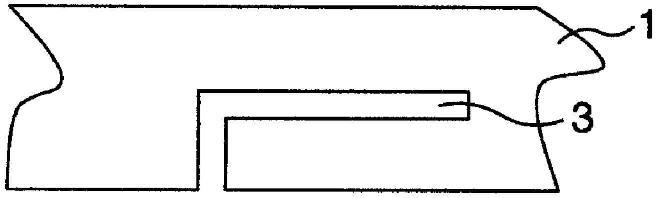
FIGS. 2A to 2D are diagrams showing a contour of a slit in a first embodiment.
Figure 2B:
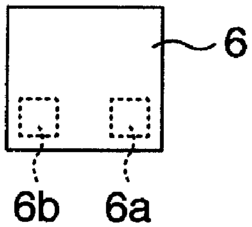
Figure 2C:
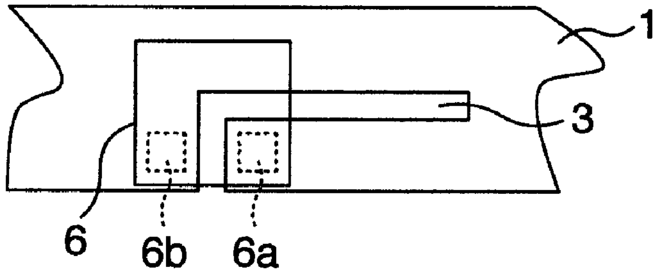

FIGS. 2A to 2D show a method of connecting the IC chip 6 to the first impedance matching section. FIG. 2A shows a first impedance matching section, i.e., an L-shaped slit 3*a* of a radiation electrode 1*a*. FIG. 2B shows two output terminals 6*a* and 6*b* of the IC chip 6. In the configuration, the output terminals 6*a* and 6*b* are implemented by forming bumps of gold on a surface of the IC chip 6. FIG. 2C shows a configuration in which the IC chip 6 is mounted on the first radiation electrode 1*a*. The output terminals 6*a* and 6*b* of the IC chip 6 are connected to the first radiation electrode 1*a* on both sides of an open end of the slit 3. The L-shaped slit 3 may be a T-shaped slit to similarly carry out the operation.

Figure 2D:
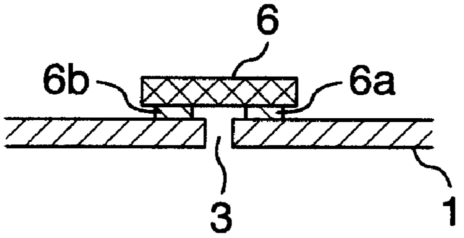

FIG. 2D is a cross-sectional view showing a state in which the IC chip 6 is mounted on the first radiation electrode 1*a*. The electrode 1*a* is electrically connected to the bumps of the IC chip 6 by use of, for example, ultrasonic junction, metallic eutectic crystallization, or conductive adhesive. The first radiation electrode 1*a* is formed using a conductive material, which is in general a metallic foil or an evaporation film made of aluminum (Al), gold (Au), silver (Ag), or copper (Cu) or a conductive paste. The first embodiment employs an aluminum foil having a thickness of 20 micrometers (μm), and ultrasonic junction is used to connect the foil to the IC chip.

Figure 3A:
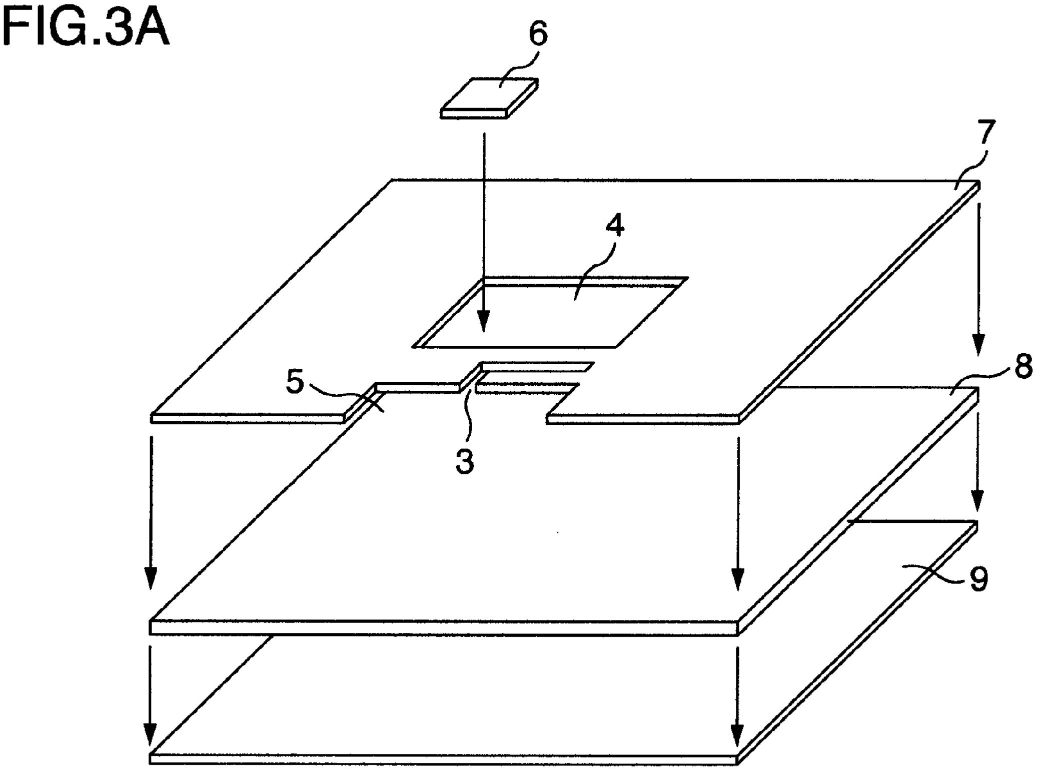
FIGS. 3A and 3B are perspective views showing a contour of a micro-strip antenna in the first embodiment.
Figure 3B:
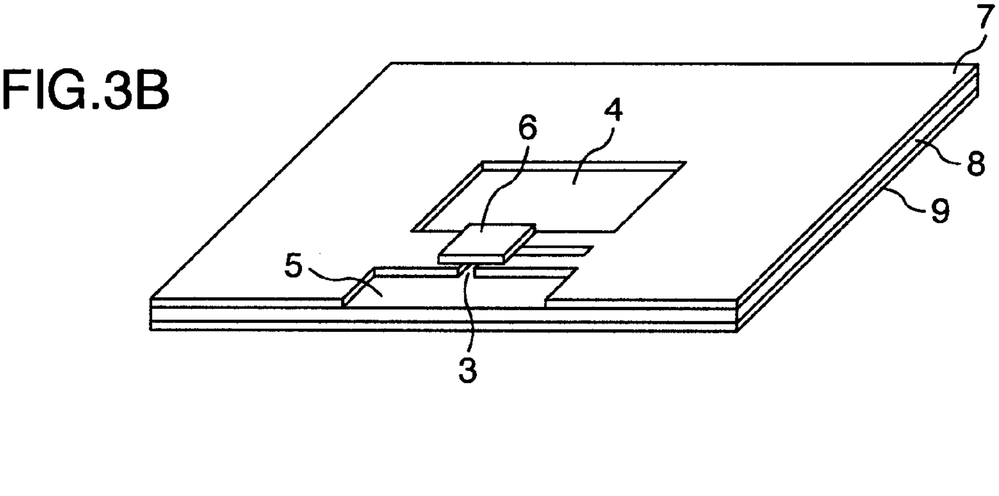

FIGS. 3A and 3B show structure of a micro-strip antenna including the first and second radiation electrodes 1 and 2 integrally formed in one unit according to the first embodiment. FIG. 3A shows layers of the antenna in which the IC chip 6 is disposed on the upper-most layer followed by the layer of a radiation electrode 7 including a slit 3 as the first impedance matching section, an opening 4 as the second impedance matching section, and a cutout 5 as the third impedance matching section. Below the radiation electrode 7, a dielectric 8 and a back conductor 9 are arranged. The dielectric 8 is formed using Polyethylene Terephthalate (PET) with a thickness of 30 micrometers. The back conductor 9 is formed using an aluminum plate having a thickness of one millimeter (mm). FIG. 3B shows an appearance of the lamination. In the configuration, the back conductor 9 is on of the conductors on which the IC chip is not mounted.

Figure 4A:
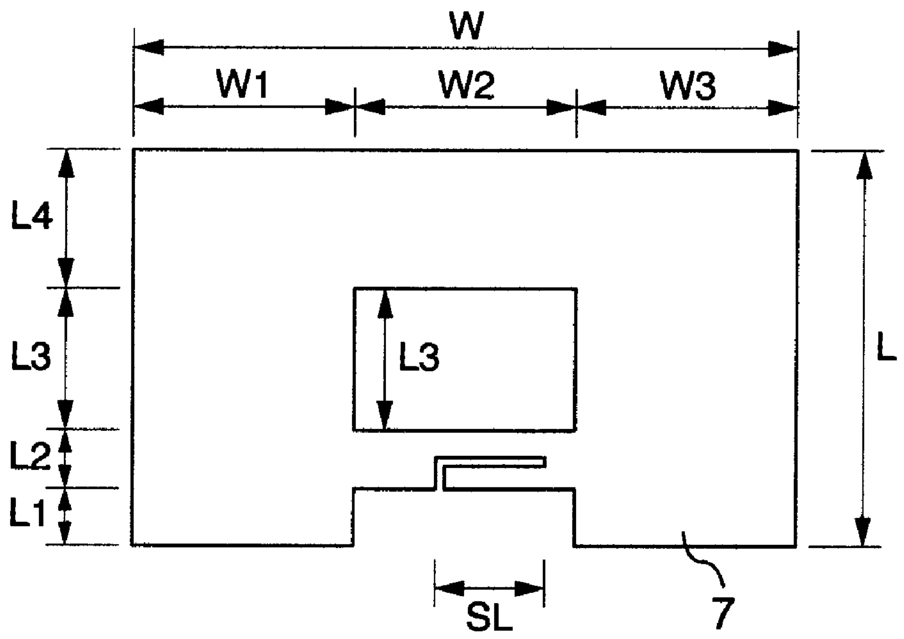
FIGS. 4A and 4B are diagrams showing a contour of a radiation electrode in the first embodiment.

Next, description will be given of an impedance matching method of the impedance matching section. FIG. 4A shows dimensional values of associated constituent components. Specifically, a radiation electrode 7 in which the first and second radiation electrodes 1 and 2 are integrally arranged has length L and width W, a portion thereof corresponding to the first radiation electrode 1 has width L2, an upper portion thereof over the opening formed by the first and second radiation electrodes 1 and 2 has length L4, the radiation electrode 1 has width W, a portion of the second radiation electrode 2 on the left side of the opening has width W1, the first radiation electrode 1 has length W2, a portion of the second radiation electrode 2 on the right side of the opening has width W3, and an L-shaped slit formed in the first impedance matching section in the first radiation electrode 1 has length SL in the longitudinal direction.

Figure 4B:
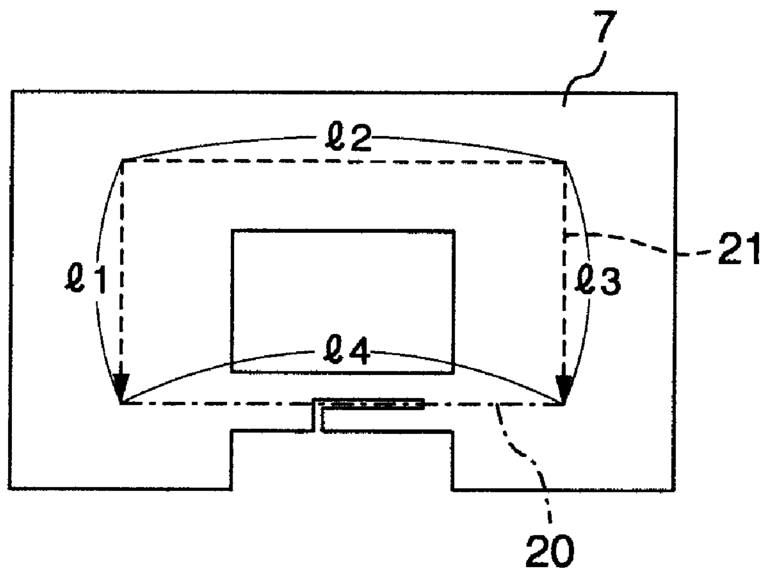

FIG. 4B shows a current flow through the radiation electrode. For the second radiation electrode, the current flow roughly includes a current flow 21 through the second radiation electrode and a current flow 20 through the first radiation electrode. The length of the current flow through the second radiation electrode is attained as below. Assume that the radiation electrode formed in the periphery of the opening is a loop having a predetermined width. The length is represented by a value ($l1+l2+l3=\lambda/2$) calculated by subtracting a length l4 of an area corresponding to the first radiation electrode in which the slit is formed from a length ($l1+l2+l3+l4$) of a path formed by continuously connecting the center positions of the width of the loop to each other. Assuming that the obtained length is half the wavelength ($\lambda$) to be used, namely, $\lambda/2$, the resonance frequency is a frequency corresponding to the length.

Assuming that the length $\lambda/2$ is Lfc, Lfc is expressed as $$Lfc = 1/2(W1+W3) + W2 + (1/2(L2+L4) + L3) \times 2.$$

In this respect, $(W1+W3)/2+W2=l2$ and $(L2+L4)/2+L3=l1=l3$.

Hence, Lfc can be regulated by use of the lengths of L3 and W2 as two sides of the opening and those of L1 and W2 as two sides of the cutout.

Next, description will be given of an example in which the radiation electrode 7 is a plate tag with L=25 mm and W=35 mm. If L and W are fixed, only the first impedance matching section is available as in the conventional configuration. That is, in the construction not including the opening 4 formed by the first and second radiation electrodes, the impedance matching cannot be appropriately carried out. Hence, it is not possible to communicate with the IC chip 6.

FIG. 11 graphically shows an antenna characteristic resulted from a simulation wherein under a condition in which length W2 of the first radiation electrode is 10 mm, W1=W2=W3, L1=0 mm, and L2=2 mm; L4 is changed in a range from 1 mm to 12 mm step-by-step with an interval of one millimeter. Since L1 and L2 are fixed values, the change in L4 corresponds to that in L3. The graph showing resonance points associated with length L4 indicates a tendency in which the resonance frequency lowers as length L4 becomes shorter. Therefore, since L3=L−(L1+l2+L4), it is confirmed that the resonance frequency becomes shorter as length L3 of the side of the opening is elongated. According to the result of the simulation in which L3 is changed with length L2 fixed to 10 mm, the phenomenon of the reduction in the resonance frequency is regarded as a tendency which appears when the peripheral or circumferential length of the opening becomes longer. That is, the longer the circumferential length is, the lower the resonance frequency is. That the resonance frequency becomes lower in this situation indicates that the electric length of the antenna is elongated. Namely, the reactance component of the antenna is increased. In consequence, the reactance component is advantageously increased by elongating the circumferential length of the opening formed by the first and second radiation electrodes.

Figure 12:
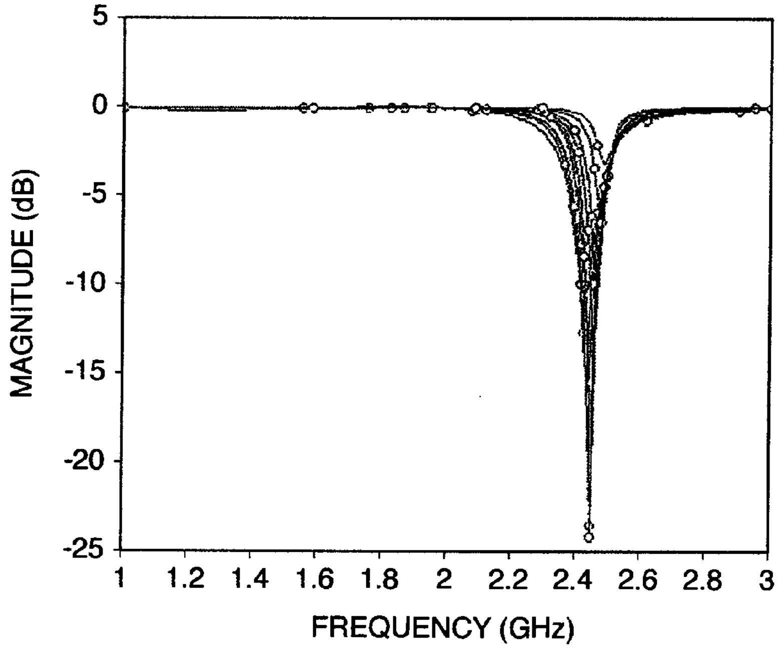
FIG. 12 is a graph showing a return loss characteristic of the micro-strip antenna when the slit length is changed in the first embodiment.
Figure 13:
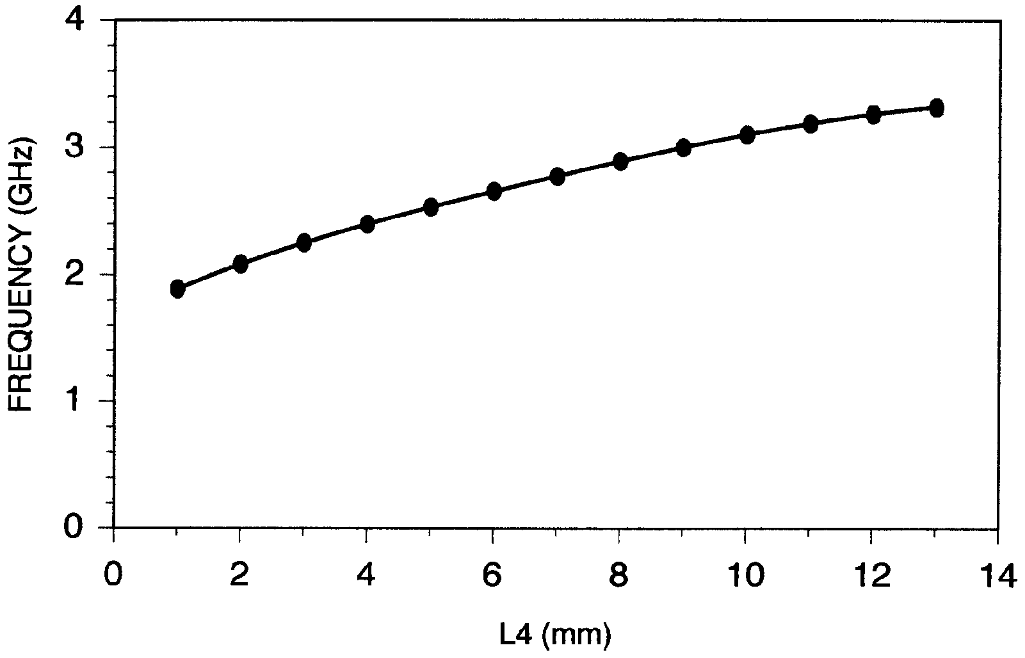
FIG. 13 is a graph showing a relationship between length L4 and the resonance frequency in the first embodiment.

Next, the value of length L3 will be specifically obtained. In the first embodiment, it is assumed that the communication is carried out at 2.4 Gigahertz (GHz). Hence, L3 is obtained during the resonance at 2.4 GHz. A simulation is performed for this purpose. This results in L4=4 mm, namely, L3=9 mm. FIG. 13 is a graph showing a relationship between length L4 and the resonance frequency obtained by changing the value of L4. The return loss is 22 dB in this case. The impedance matching may be conducted with higher accuracy by use of the first impedance matching section. FIG. 12 shows an antenna characteristic attained by a simulation wherein length SL of the slit 3 is changed in a range from 2 mm to 6 mm with L3 fixed to 9 mm. The return loss varies from −3 dB to 24 dB as a result. In this example, for SL=4 mm, the return loss is improved from −22 dB to −24 dB, namely, an improvement of 2 dB is obtained.

Figure 14:
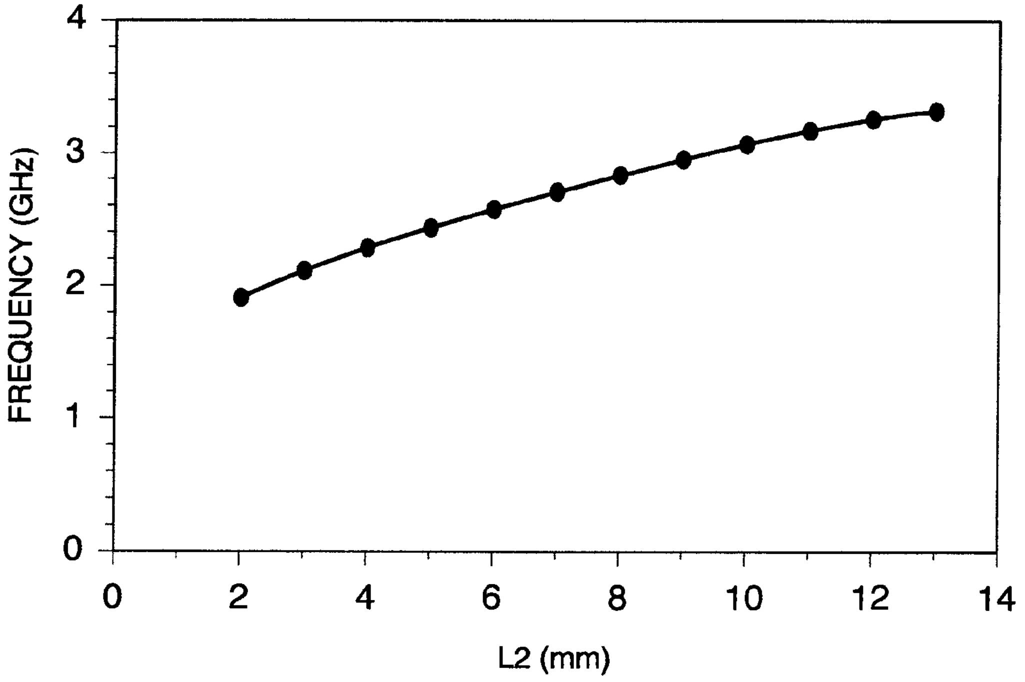
FIG. 14 is a graph showing a relationship between length L2 and the resonance frequency in the first embodiment.

It is possible to change length L3 of the opening by use of width L2 of the first radiation electrode. FIG. 14 graphically shows a relationship between L2 and the resonance frequency when L2 is changed like in the above example. When L2 is changed from 2 mm to 13 mm, the resonance frequency varies from 1.9 GHz to 3.3 GHz. It is hence possible to obtain a desired resonance frequency without changing the external dimensions of the radiation electrode.

Figure 16:
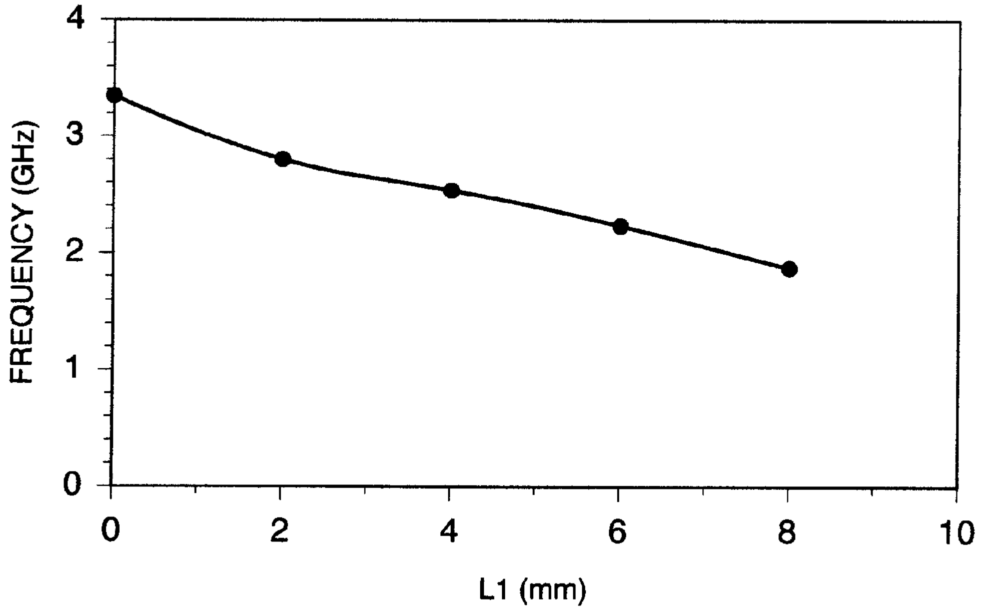
FIG. 16 is a graph showing a relationship between length L1 and the resonance frequency in the first embodiment.

Description will now be given of an advantage obtained by the cutout 3 as the third impedance matching section. The resonance frequency varies when length L1 of the cutout 3 formed by the first and second radiation electrodes is changed. Length L1 is changed with L2 fixed to 2 mm and L4 fixed to 2 mm. FIG. 16 is a graph showing a relationship between length L1 and the resonance frequency. When L1 is changed from 0 mm to 8 mm, the resonance frequency varies from 3.3 GHz to 1.9 GHz. The greater the cutout is, the higher the resonance frequency is. That is, as L1 becomes longer, L3 is reduced and the opening becomes smaller.

Figure 15:
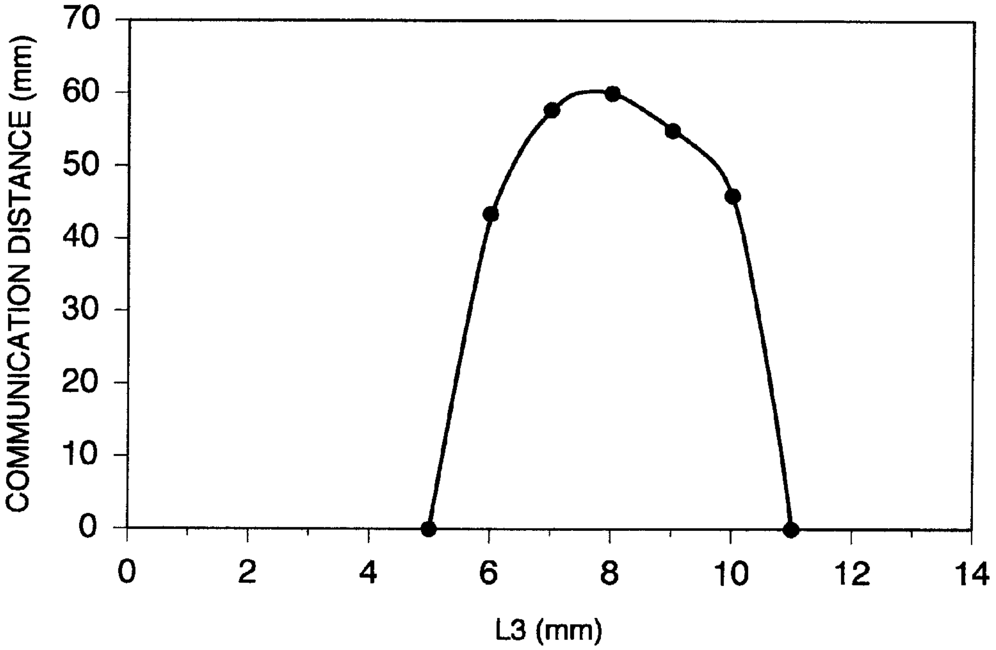
FIG. 15 is a graph showing a relationship between length L3 and the communicable distance in the first embodiment.

By experimentally producing the antenna including a dielectric having a thickness of 300 μm, the communicable distance of the antenna is measured. Using a reader device for a frequency of 2.45 GHz, a transmission power of 200 milliwatt (mW), and an antenna gain of 6 dBi, the communicable distance is obtained as 60 mm. FIG. 15 graphically shows measured results of the communicable distance with respect to length L3. The maximum communicable distance is 60 mm for L3=8 mm. When L3 is equal to or less than 5 mm or is equal to or more than 11, it is not possible to conduct communication with the IC chip.

Description will now be given of the reason why two impedance matching sections, i.e., the first and second impedance matching sections are employed. As above, the second impedance matching section has an aspect that the impedance can be remarkably further adjusted as compared with the first impedance matching section. Specifically, the second impedance matching section roughly adjusts the impedance and then the first impedance matching section precisely adjusts the impedance.

When the radiation electrode is constructed only by the second impedance matching section, the section is formed in a loop. If the radiation electrode is small in size, there is formed a narrow loop. In a micro-strip antenna, when the radiation electrode area becomes larger, the magnetic field on the radiation electrode area is increased. Hence, a stronger electric field can be radiated. Therefore, as compared with a loop-type antenna not including the first impedance matching section, the micro-strip antenna including the first and second impedance matching sections like the present embodiment is more efficient. By use of the micro-strip antenna, there can be provided a radio frequency IC tag having a longer communicable distance.

Second Embodiment

Figure 5A:
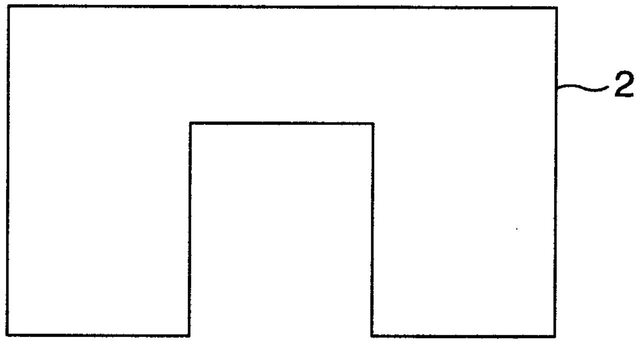
FIGS. 5A to 5D are diagrams showing a contour of a radiation electrode in a second embodiment.
Figure 5B:
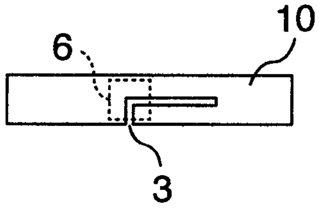

FIGS. 5A to 5D show a tag configuration in a second embodiment. In conjunction with this embodiment, description will be given of a method in which a small-sized inlet 10 is employed as a first radiation electrode (corresponding to the first radiation electrode 1 of FIG. 1) to be combined with a second radiation electrode 2 to implement a radio frequency IC tag. The small-sized inlet 10 shown in FIG. 5B is obtained by using a tag inlet (50 mm) for a general radio frequency IC tag operating at a 2.4 GHz band, specifically, by reducing the long side thereof to 20 mm. In the configuration of the inlet, an IC chip is mounted on an antenna. In the second embodiment, an IC chip is mounted on a dipole antenna. An L-shaped slit 3 is disposed in the inlet for the impedance matching with the IC chip 6. The slit 3 serves as the first impedance matching section in the present embodiment. In this connection, there also exists an inlet in which the antenna and the IC chip are surrounded by a lamination member (a dielectric) including a synthetic resin, e.g., PET, Polypropylene (PP), and/or Polyethylene (PE).

The second radiation electrode 2 is formed using a 20-μm thick aluminum foil. The electrode 2*a* has the external dimensions L and W substantially equal to those of the first embodiment.

Figure 5C:
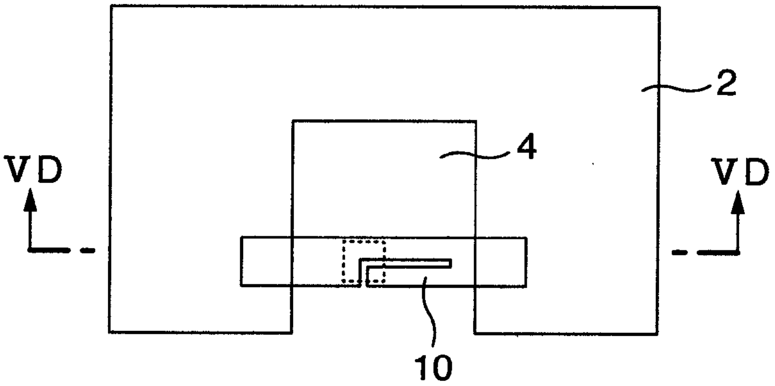
Figure 5D:
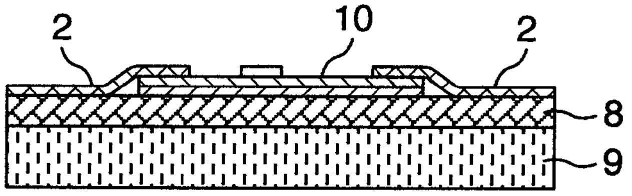

As FIG. 5C shows, the small-sized inlet 10 and the second radiation electrode 2 overlap with each other to separately configure the power feed section and the radiation section, respectively. In this configuration, the small-sized inlet 10 and the second radiation electrode 2 form, in the radiation electrode surface, an opening 4 to serve as the second impedance adjusting or matching section. The opening 4 and the cutout 5 are formed so as to respectively have predetermined sizes in accordance with the relative coupling position between the first and second radiation electrodes 2, 10. That is, the size of the opening is adjusted by adjusting the positional relation between the first and second radiation electrodes 2, 10. FIG. 5D shows a cross-sectional view taken along line A-A' of FIG. 5C. To produce this structure, the inlet 10 is arranged in an upper layer of a substrate 8, and then the second radiation electrode 2 is laminated onto the layer of the inlet 10.

The substrate 8 is used as the dielectric of the micro-strip structure. On the back surface of the substrate 8, the back conductor is arranged to form a micro-strip antenna.

It is only required that the inlet 10 and the second radiation electrode 2 are electrically link to each other. Specifically, the inlet 10 and the electrode 2 may be coupled with each other via a direct-current (DC) or via an alternating-current (AC), namely, via an interval allowing electrostatic coupling therebetween via a lamination member or adhesive material of the inlet 10. Hence, the inlet 10 can be disposed over the second radiation electrode 2.

When the antenna of the inlet is coupled via the dielectric with the second radiation electrode 2, the electric length of the antenna is elongated due to influence from the dielectric. This resultantly increases the reactance component and advantageously broadens the impedance adjusting range.

As an upper layer of the radiation electrode 2, there may be disposed a resin substrate 8 of PET and/or PP, not shown, as a protective layer of the antenna and the like. The substrate 8 may be a synthetic resin substrate of PET, PP, and/or PE to be integrally formed using a heat sealing method.

The radio frequency IC tag produced in the above configuration similarly has almost the same communication characteristic as that of the radio frequency IC tag of the first embodiment.

Third Embodiment

Figure 6A:
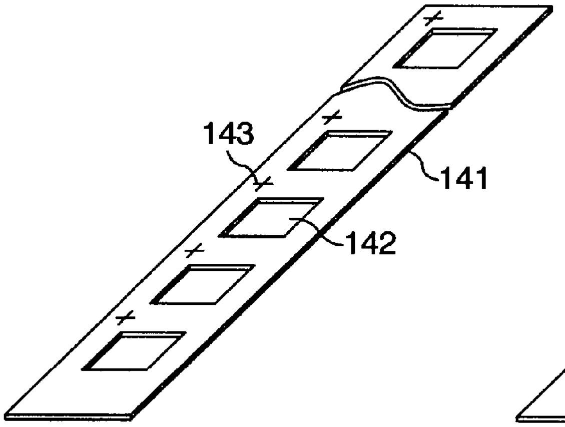
FIGS. 6A to 6C are diagrams showing a method of producing a radiation electrode in a third embodiment.
Figure 6B:
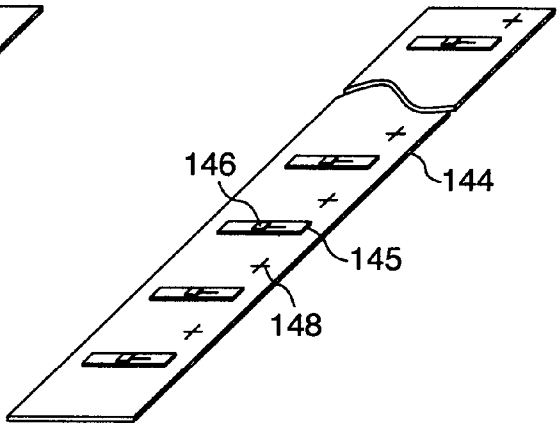
Figure 6C:
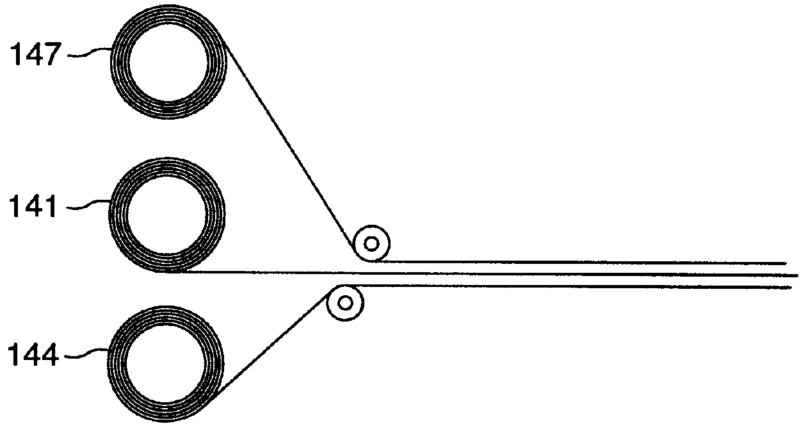

FIGS. 6A to 6C show a method of sequentially producing the tag structure of the second embodiment according to a third embodiment. The second embodiment employs a configuration in which the inlet 10 as the first radiation electrode 1 overlaps with the U-shaped metallic foil as the second radiation electrode 2. If each tag is separately produced, the process to overlap the first radiation electrode 1 with the second radiation electrode 2 takes a long period of time. To remove this difficulty, the tag structure is sequentially produced by overlapping a first radiation electrode sheet 144 on which the first radiation electrode is beforehand formed over a second radiation electrode sheet 141 on which the second radiation electrode is formed in advance. FIG. 6A shows the configuration of the second radiation electrode sheet 141. In the sheet 141, an opening 142 and an alignment mark 143 are repeatedly formed. The sheet 141 is conductive and includes an about 20-μm thick metallic foil of, for example, aluminum or copper. Although not shown, a resin film of PET, PP, and/or PE may be disposed as a reinforcing member on one or both of the surfaces of the metallic foil. The second radiation electrode may be printed on a resin film or a sheet of paper by using conductive paste. FIG. 6B shows the configuration of the first radiation electrode sheet 144. In the configuration, a first radiation electrode 145 in which an impedance matching slit is formed and an alignment mark 148 are repeatedly arranged on a resin sheet. An IC chip 146 is mounted over the slit. FIG. 6C schematically shows a process of lamination including the first radiation electrode sheet 144, the second radiation electrode sheet 141, and a protective film 147. For the first and second radiation electrode sheets 144 and 141, the respective alignment marks 143 and 148 are detected to align the first radiation electrode 145 such that the portion of the opening 142 corresponding to L3 has a desired length. These films are fixed onto each other in a heat sealing method using a heater or by use of an adhesive.

Figure 7A:
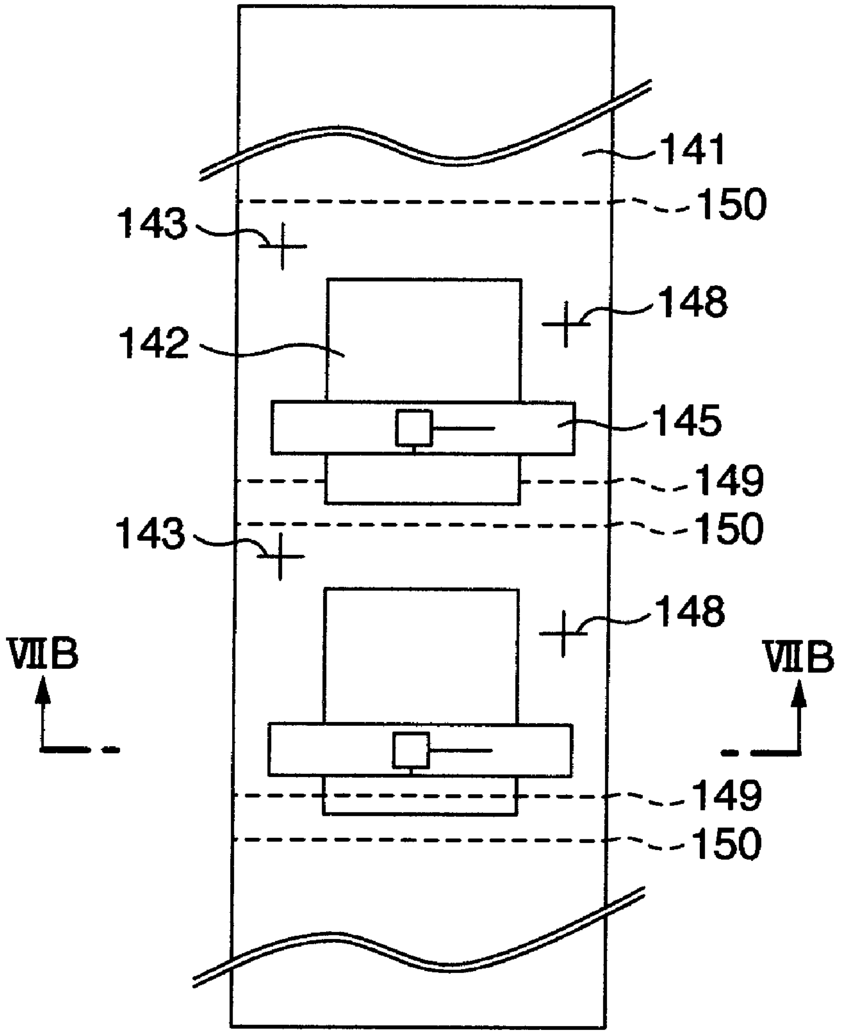
FIGS. 7A and 7B are schematic diagrams showing a configuration of a radiation electrode in the third embodiment.
Figure 7B:
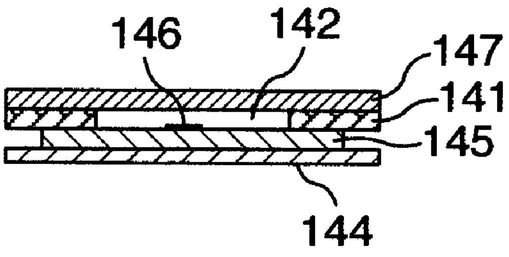

FIG. 7A shows a result of the process in which the first and second radiation electrode sheets 144 and 141 are fixedly arranged at desired positions. By cutting the radiation electrode sheet produced as above at cutoff lines 149 and 150, a desired radiation electrode in which the IC chip is mounted is attained. The production process can be simplified by use of only one cutoff line 149. FIG. 7B shows a cross-sectional view of the radiation electrode along line VIIB-VIIB of FIG. 7A. In the configuration, the second radiation electrode 141 is arranged on the first radiation electrode 145, and the protective film 147 is further disposed on the second radiation electrode 141. Conversely, first radiation electrode 145 may be arranged on the second radiation electrode 141. This configuration also serves substantially the same function.

Fourth Embodiment

Figure 8A:
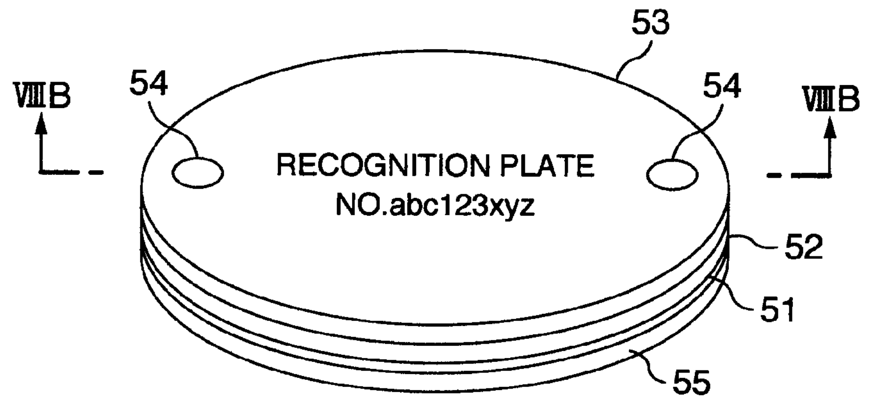
FIGS. 8A and 8B are schematic diagrams showing a configuration of a plate tag in a fourth embodiment.
Figure 8B:
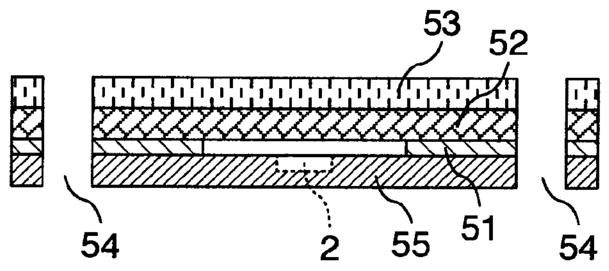

FIGS. 8A and 8B show structure of the radio frequency IC tag in a fourth embodiment. In the conventional operation, the micro-strip antenna is used with its radiation electrode facing upward to upwardly radiate a radio wave. In the fourth embodiment, the radiation electrode and the back conductor are substantially equal in dimensions to each other, and the radio wave is emitted from the surface of the back conductor.

It has been highly desired to downsize the radio frequency IC tag. Additionally, it is also desired to reduce the IC tag in thickness. Hence, the IC chip itself has been reduced in thickness. However, the reduction in thickness of the IC chip leads to a problem ob destruction of the IC chip by external force. In the micro-strip antenna, a back conductor of metal is arranged on the back surface of the antenna. This metallic plate is employed as a reinforcing plate of the IC chip. Description will now be given of such configuration.

FIG. 8A shows an appearance of a plate tag including a laminated configuration of a metallic plate 53, a dielectric 52, a radiation electrode 51, and a protective member 55 in this order. Holes 54 are disposed to install the tag as a plate. In the configuration, the metallic plate 53 corresponds to the back conductor of the micro-strip antenna. As above, the metallic plate 53 and the radiation electrode 51 are almost equal in dimensions to each other. Specifically, the metallic plate 53 has a radius which is about one millimeter larger than that of the radiation electrode 51. This leads to an advantage as below. Materials suitable for welding are selected for the dielectric 52 and the protective member 55 to shield the IC chip and the radiation electrode 51 to thereby increase immunity of the IC tag against environments. Also, since the metallic plate 53 can be stamped with identifying information, the information can be confirmed in two ways, namely, through a visual check and a radio communication.

In the fourth embodiment, the metallic plate 53 is a 1.2-mm thick stainless steel plate, the dielectric 52 is a PET/PP laminated film having a thickness of 300 μm, the radiation electrode 51 is a 20-μm thick aluminum foil, and the protective member 55 is a PET/PP laminated film having a thickness of 600 μm. The metallic plate 53 and the dielectric 52 are produced in one unit by use of adhesive. The dielectric 52, the radiation electrode 51, and the protective member 55 are configured in one unit by welding.

The tag has an external shape of an ellipse (30 mm×20 mm). As a result of an experiment using a reader unit of a frequency of 2.4 GHz, transmission power of 200 mW, and an antenna gain of 6 dBi, it has been detected that the tag has a communicable distance of 70 mm from the surface of the metallic plate 53. The metallic plate 53 is employed as the surface to increase strength against pressure. Specifically, strength against a in-plane load of ten tons and strength against a point load of three tons are obtained. FIG. 8B shows cross-sectional structure of the plate tag.

Figure 9A:
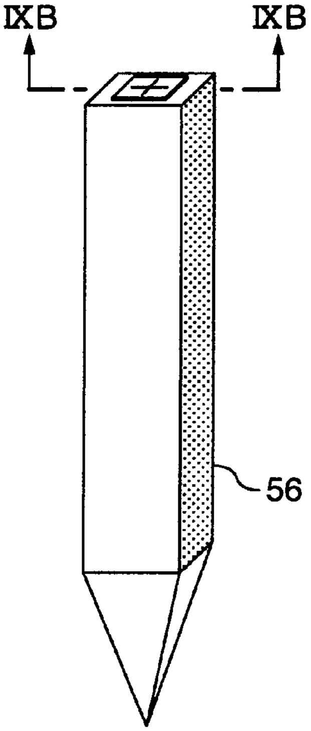
FIGS. 9A and 9B are diagrams showing a contour of a boundary stake in the third embodiment.
Figure 9B:
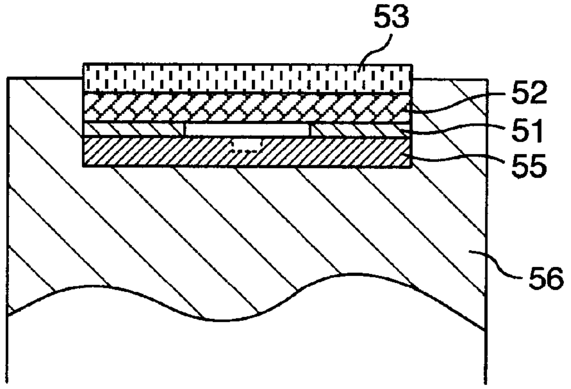

FIGS. 9A and 9B show an example in which the fourth embodiment is applied to a boundary stake made of concrete. FIG. 9A shows a concrete boundary stake 56 in which the radio frequency IC tag is installed in an upper surface of the stage 56 with the metallic plate 53 facing upward. The IC tag is configured as described above.

FIG. 9B shows a cross-sectional view taken along line IXB-IXB of FIG. 9A. Conventionally, the surface of the IC tag is coated with a resin cover (a protective member) which transmits a radio wave. Since the resin is deteriorated by ultraviolet rays of the sunlight, the IC tag can be used only a limited period of time. In contrast thereto, according to the fourth embodiment, the resin member is not affected by ultraviolet rays. Hence, the IC tag can be advantageously used for a longer period of time.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A radio frequency integrated circuit (IC) tag, comprising:
- an IC chip;
- a first conductor for connecting to the IC chip;
- a second conductor;
- a dielectric formed between the first and second conductors;
- a slit formed in the first conductor such that the IC chip is arranged over the slit with two terminals thereof respectively on both sides of the slit, the slit including an open end in one side of the first conductor; and
- an opening with a circumference having a length which has a positive correlation with a value obtained by subtracting impedance of the first conductor from impedance of the IC chip.

2. A radio frequency integrated circuit (IC) tag according to claim 1, wherein the opening is an opening in which the first conductor of a loop shape is formed in the periphery of the opening, and wherein a value calculated by subtracting a length of an area corresponding to the first conductor in which the slit is formed from a length of a path formed by continuously connecting center positions of the width of the loop to each other is a length associated with half a wavelength to be used.

3. A radio frequency integrated circuit (IC) tag according to claim 2, wherein the first conductor includes a first radiation electrode including a power feed section and a second radiation electrode, the first and second radiation electrodes being coupled via a second dielectric with each other.

4. A radio frequency integrated circuit (IC) tag according to claim 3, wherein the opening and a cutout are formed so as to respectively have predetermined sizes in accordance with relative coupling position between the first and second radiation electrodes.

5. A radio frequency integrated circuit (IC) tag according to claim 3, wherein the first radiation electrode is an antenna of an inlet.

6. A radio frequency integrated circuit (IC) tag according to claim 5, wherein the second dielectric is a base film of the inlet, an adhesive, or a substrate for holding the second radiation electrode.

7. A radio frequency integrated circuit (IC) tag according to claim 1, wherein the first and second conductors have substantially equal in size to each other.

8. A radio frequency integrated circuit (IC) tag comprising an IC chip and a micro-strip antenna, wherein:

the micro-strip antenna comprises:

a first conductor including two impedance matching sections for adjusting impedance of the IC chip and impedance of the micro-strip antenna, wherein the first impedance matching section is a slit-shaped notch, and wherein the second impedance matching section is an opening having a circumference surrounded by the first conductor and wherein the opening has a circumferential length in which the first conductor of a loop shape is formed in the periphery of the opening, and wherein a value calculated by subtracting a length of a center line of the loop in an area corresponding to the first conductor in which the slit is formed from a length of the center line of the loop is a length associated with half a wavelength to be used;

a second conductor; and a dielectric formed between the first and the second conductor.

* * * * *